United States Patent [19]

Duncan et al.

[11] Patent Number: 4,812,366

[45] Date of Patent: Mar. 14, 1989

[54] VISCOSITY ADJUSTMENT OF AMMONIATED UREA-FORMALDEHYDE RESIN COMPOSITIONS BY ADDITION OF DRIED UREA-FORMALDEHYDE POWDER

[75] Inventors: Thomas F. Duncan, Louisville, Ky.; Regis F. Kline, New Albany, Ind.

[73] Assignee: Borden Inc., Columbus, Ohio

[21] Appl. No.: 148,303

[22] Filed: Jan. 25, 1988

[51] Int. Cl.⁴ .............................................. C08L 61/32
[52] U.S. Cl. .................................. 428/528; 428/530; 156/314; 156/319; 156/331.3; 524/542; 525/517
[58] Field of Search ................ 524/542; 428/528, 530; 156/314, 319, 331.3; 525/517

[56] References Cited

U.S. PATENT DOCUMENTS

| | | | |
|---|---|---|---|
| 3,684,690 | 8/1987 | Kraus | 524/542 |
| 3,697,355 | 10/1972 | Black . | |
| 3,816,236 | 6/1974 | Baymiller . | |
| 3,827,995 | 8/1974 | White | 524/542 |
| 4,119,598 | 10/1978 | Pearson . | |
| 4,247,433 | 1/1981 | Schamberg et al. . | |
| 4,340,543 | 9/1982 | Bruquera . | |
| 4,623,691 | 11/1986 | Taylor | 524/542 |

FOREIGN PATENT DOCUMENTS

| | | | |
|---|---|---|---|
| 0001596 | 5/1979 | European Pat. Off. | 524/542 |
| 7606068 | 12/1976 | Netherlands | 524/542 |

*Primary Examiner*—C. Warren Ivy
*Attorney, Agent, or Firm*—Dennis H. Rainear

[57] ABSTRACT

The invention relates to a composition of matter comprising an ammoniated urea-formaldehyde resin and a water soluble dried urea-formaldehyde resin powder wherein the ratio of ammoniated to dried urea-formaldehyde resins is from approximately 20:1 to 1:20 weight. A process for adhering paper to a lignocellulosic substrate using the composition of matter is provided. By this invention, high solids, shelf stable adhesive compositions containing low levels of free formaldehyde are provided which, when catalyzed, will cure under heat and/or pressure, to adhere decorative paper to a lignocellulosic substrate.

22 Claims, No Drawings ered to the UF resin solution or suspension, which is generally provided in an aqueous solution. The resulting combination of the water soluble dried UF resin powder and the aqueous solution of ammoniated UF resin is referred to herein as the "combined resin composition."

VISCOSITY ADJUSTMENT OF AMMONIATED UREA-FORMALDEHYDE RESIN COMPOSITIONS BY ADDITION OF DRIED UREA-FORMALDEHYDE POWDER

BACKGROUND OF THE INVENTION

The industrial success of facing particleboard with decorative materials for use in walls, furniture and cabinets depends largely on achieving high levels of bond strength at relatively low cost. One widely used technique utilizes urea-formaldehyde (UF) resins to bond low weight decorative paper to various fiberboard or paperboard substrates. UF resins, however, are not generally used to bond high weight decorative paper, such as paper whose weight exceeds 60 grams/square meter, because of marginal to poor adhesive properties. It is possible to achieve desirable adhesive properties from UF resin adhesives for bonding high weight paper by use of high solids UF resin compositions. However, conventional high solids compositions utilizing UF resins are undesirable for a number of reasons including the high free formaldehyde content, poor shelf storage, poor tack, poor wetting characteristics, and poor clean up capability, among others.

Polyvinyl acetate (PVA) adhesives often are used as an alternative to UF to bond paper to various substrates, including lignocellulosic substrates. PVA adhesives have an advantage of fast cure speeds under marginal cure conditions but are also more expensive and frequently exhibit poor performance properties relative to those of UF adhesives. PVA adhesives can cause fiber swelling with subsequent undesirable protrusion of the fibers through the paper face. In addition, PVA adhesives exhibit little water resistance.

Two techniques are known in the art to make a UF resin which has a very low free formaldehyde content. One such technique calls for making a conventional UF resin of a low formaldehyde/urea (F/U) mol ratio, i.e., 1.2/1 to 1.5/1. A second technique utilizes an ammoniated UF resin. In the former technique, UF resins possessing low tack, poor stability, poor clean up characteristics and poor reactivity often result. In the latter technique, resins of low formaldehyde content can be achieved while maintaining desirable clean up and tack properties of the resins with high F/U mol ratios. Unfortunately, stripping the resin of solvent to achieve high solid levels often sacrifices storage capability and excessively high viscosities result. To counter this adverse result while maintaining high solids levels, the extent of the condensation reaction can be limited. This, however, results in a marked reduction in reactivity of the resin.

Therefore, it is desirable to have a high solids, shelf stable, low free formaldehyde, UF resin adhesive for bonding paper to substrates.

SUMMARY OF THE INVENTION

The present invention relates to high solids UF resin adhesive compositions and processes for making them, which compositions are useful as adhesives for bonding paper to substrates. The high solids adhesive compositions are prepared by the addition of water soluble dried UF resin to a solution or suspension of an ammoniated UF resin. The high solids, UF resin compositions of the present invention are applied to lignocellulosic substrates, catalyzed, covered with a decorative top ply and the composite thus formed is laminated by subjecting the composite to heat and pressure, whereby the adhesive composition cures.

DETAILED DESCRIPTION OF THE INVENTION

The present invention is directed toward a composition of matter useful as an adhesive for bonding paper to various substrates. More specifically, the invention relates to a curable ammoniated urea-formaldehyde resin solution or suspension to which has been added an amount of dried water soluble urea-formaldehyde resin powder sufficient to increase the viscosity of the combined resin composition without adversely effecting the shelf stability or significantly increasing the free formaldehyde content.

Thus, the invention relates to a composition of matter comprising an aqueous solution or suspension of an ammoniaed urea-formaldehyde resin to which has been added a water soluble dried urea-formaldehyde resin powder. By adding an amount of a dried UF resin powder to the aqueous solution or suspension of ammoniated UF resin, the solids level of the solution can be increased to approximately 75% by weight without significantly adversely effecting the shelf stability of the adhesive composition produced.

By "ammoniated UF resin" herein is meant a urea-formaldehyde resin prepared by a known method or methods, which resin has been reacted with ammonia, by a known method or methods. Ammoniated UF resins are commonly, but not exclusively, produced by mixing ammonia and a UF resin, or by mixing ammonia with formaldhyde followed by the addition of urea. The method of production of the ammoniated UF resins utilized in the present invention is not a limitation. The ammonia, in addition to reacting with the resin, serves to bind up a substantial amount of the free formaldehyde present in the UF resin.

By "dried urea-formaldehyde" herein is meant urea-formaldehyde resin in a dried form or a powdered form, wherein a UF resin, which is generally produced in an aqueous solution, dispersion, or suspension is dried by any procedure known in the art. Spray drying of urea-formaldehyde resins is the most common method of driving off water to produce powdered UF resins and spray drying is the preferred method herein. However, "spray dried" is not meant as a limitation herein on the means by which the urea-formaldehyde resin is dried. The water soluble dried UF resin powder can be dried by any conventional technique including heated air, heating lamps and ovens. The preferred drying technique is to pass heated air over or through a UF resin. The dry resin powder can be of any particle size but the preferred particle size is within the range of from about −30 to +300 mesh. Thus, urea-formaldehyde resins in dry form but not dried by a spray procedure are also operative in the present invention.

The ammoniated UF resin is generally available (Borden, Inc., Chemical Division, Louisville, Ky.) as a 65% solids solution or suspension of resin in water. Therefore, according to the present invention, a 90:10 mixture of a 65% solids solution of ammoniated UF resin and 100% solids dried UF resin powder, respectively, constitutes a solids ratio of about 5.85:1. This ratio can be increased to a ratio preferably no greater than 20:1 by decreasing the amount of dried UF resin powder added to the solution or suspension of ammoniated UF resin. The lower limit of this ratio of ammoniated UF resin solids to dried UF resin powder solids, when the ammoniated UF resin is a 65% solids solution, is approximately a 75:25 mixture. This produces a solids ratio of ammoniated UF resin to dried UF resin powder of approximately 2:1, respectively. A 70:30 mixture of a 65% solids ammoniated UF resin: dried UF resin powder is excessively thick and pasty with unacceptably short gellation time (i.e., poor shelf life).

The ratio of ammoniated UF resin solids to spray dried UF resin solids can be reduced below the 2:1 ratio upon the addition of a solvent such as water or a mixture of water and an alcohol and the addition of more dried UF resin. The lower limit of the ratio of ammoniated UF resin solids to dried powder UF resin solids is limited only by the solubility of the dry powder UF resin in the solvent, preferably water, and the preferred total solids level of no less than 60%. Thus, a ratio of, for example, 1:20 by weight of ammoniated UF resin solids to dried powder UF resin solids is attainable upon addition of sufficient water to dissolve or disperse the UF resin powder and to thereby bring the total solids level to a range of approximately 60 to 90%, and preferably 65% to 75% by weight. Any solvent capable of dissolving, or diluent capable of dispersing, the UF resins is serviceable in the present invention. The high solids adhesive compositions are preferably diluted by the addition of one or more solvents selected from the group consisting of water and $C_1-C_3$ alcohols. It is desirable to maintain a low solvent level to expedite the cure and minimize bubbling or cracking of the paper or substrate as any remaining solvent is volatilized during the lamination step. Environmental concerns may also indicate a desire for low alcohol solvent emission levels. If an alcohol is used, $C_1-C_3$ alcohols are preferred. Higher alcohols are operative but may suffer from reduced resin solubility. The more preferred solvent is water. The preferred solvent level in the composition is from about 10% to about 40% by weight.

Thus, the invention also relates to a composition of matter comprising an aqueous solution or suspension of an ammoniated urea-formaldehyde resin to which has been added (a) a water soluble, dried urea-formaldehyde resin powder; and (b) additional solvent selected from the group consisting of water and $C_1-C_3$ alcohols, wherein the ratio of ammoniated urea-formaldehyde resin to dried urea-formaldehyde resin is from approximately 2:1 to 1:20 by weight.

As with all urea-formaldehyde resins or urea-formaldehyde ammonia resins, speed of cure for the adhesive composition of the invention is pH dependent. Generally, the lower the pH is, the faster the cure will be. For the dressed panel stock applications for which the adhesive compositions of this invention are intended, it is generally required that the pH be reduced below 4.0, preferably 3.0, in order to achieve a very rapid cure.

Weak acid salts, such as ammonium chloride, ammonium sulfate, ammonium thiocyanates, etc. normally used to catalyze urea-formaldehyde resins for gluing plywood, furniture, etc. are operative in the present invention, but are slower to initiate the cure reaction since they depend on free formaldehyde being present in the resin to achieve lower pHs. Free formaldehyde in the resin undergoes the Cannizzaro reaction to produce formic acid. This increased acid content further lowers the pH which accelerates the cure. Therefore, resin with low free formaldehyde content can have the pH reduced by the addition of a pH reducing catalyst. The pH reducing effect is immediate. For the purposes of this invention, metal acid salts, such as $Al_2(SO_4)_3$, $AlCl_3$, and $NaHSO_4$, among others, are preferred when the catalyst is to be mixed with the resin. It is preferred that the catalyst be in water solution since the direct addition as a powder may cause localized gellation of the composition prior to the complete catalyst dissolution. When the catalyst is applied to the substrate separately from the adhesive composition, i.e. applied to the gluing face of the paper or to the flash dried surface of the composition, an acid is preferred to a salt due to the greater reactivitiy of the acid.

Although phosphoric acid has been used predominantly as the catalyst, it is believed that hydrochloric and sulfuric acids also could be utilized to catalyze the cure of the adhesive compositions. A preferred catalyst consists of a 20% water solution of maleic anhydride thickened to 150–300 cps at 25° C. with a thickening agent. A more preferred catalyst consists of a 50% water solution of aluminum chloride. Therefore, the invention further relates to UF resin compositions further comprising a sufficient amount of a pH reducing catalyst added to accelerate the cure of the composition. Any catalyst known to cure urea-formaldehyde resins is operative in curing the compositions of the present invention. These can include, but are not limited to, acids such as sulfuric acid, hydrochloric acid, phosphoric acid, maleic acid or salts such as aluminum chloride, aluminum sulfate, sodium bisulfate, ammonium sulfate, ammonium chloride, and also maleic anhydride.

The present invention also relates to a process for contacting one of the instant adhesive compositions between a lignocellulosic substrate, such as particleboard, wood or paperboard and a paper top ply, which paper top ply is caused to adhere to the lignocellulosic substrate by the cure or partial cure of the adhesive composition. Thus, the present invention further relates to a process for adhering paper to a lignocellulosic substrate, said process comprising:

(a) preparing a composition comprising an aqueous solution or suspension of an ammoniated urea-formaldehyde resin, a dried water soluble urea-formaldehyde resin powder, and a catalyst in an amount sufficient to reduce the pH of the composition to thereby accelerate the cure of the composition;

(b) applying the composition to a lignocellulosic substrate or to a paper or to both; and (c) contacting the paper with the lignocellulosic substrate;

whereby the paper adheres to the substrate to produce a laminate. The laminate, generally, is subjected to pressure and/or elevated temperature to promote the cure of the composition, whereby the paper is caused to adhere to the substrate. In certain applications, it may be necessary to remove the water from the adhesive composition after the adhesive composition is applied to the lignocellulosic substrate or the paper or both. Flash drying, for example, may be used to remove the water. In addition, if the catalyst of step (a) above is not incorporated directly into the adhesive composition, it can be applied to the substrate or the paper or both, before, during, or after the solvent removal step.

In a preferred embodiment of the present invention, the ammoniated UF resin has a F/U mol ratio of, for example, 2.6:1 to 1.7:1 and the dried, water soluble UF resin powder has a F/U mol ratio of approximately 1.6:1 to 1.3:1. In a more preferred embodiment, the ammoniated UF resin has a F/U mol ratio of approximately 2.1:1 and the dried water soluble UF resin powder has a F/U mol ratio of approximately 1.5:1.

The water soluble spray dried UF resin powder may be added directly to the ammoniated UF resin solution or suspension during manufacture after condensation and neutralization of the ammoniated resin to a pH of 7.6–8.0. Vacuum distillation may be utilized to achieve a predetermined viscosity end point, per cent solids level, or specific gravity in the resulting adhesive composition.

In general, the viscosity of the UF resin composition before adding the water soluble spray dried UF resin is from 500 to 3000 cps and the preferred viscosity is from about 600 to 1200 cps when measured at 25° C. The viscosity after mixing the water soluble spray dried UF resin powder with the ammoniated UF resin can be 600 to 8000 cps at 25° C. and the preferred viscosity is from about 800 to 5000 cps at 25° C.

According to the present invention, water soluble, spray dried UF resin is added to the ammoniated UF resin solution or suspension whereby the solids level increases and the viscosity increases. By this method is produced an adhesive composition with low free formaldehyde content, and which, when catalyzed by a sufficient amount of a catalyst, will form an excellent curable adhesive composition for bonding paper to lignocellulose substrates.

One embodiment of the present invention is the use of an ammoniated UF resin/spray dried UF resin powder adhesive composition supplied as a blended resin composition. A catalyst in the form of a metal acid salt, for example, can be added to the composition at the time of use. The catalyzed adhesive composition can be applied to the substrate of choice, i.e., either a panel to be faced with paper or to the paper itself, at a rate of for example, 8–15 lbs per thousand square feet. The adhesive can be flash dried, if desired, to a surface temperature of 54° C. to 60° C. (130° F. to 140° F.) with radiant heat to partially remove water and any other volatiles. The panel substrate and paper are then brought together to form a composite or laminate as they pass through a heated nip roll or into a flat, platen heated press for a final cure. Generally, the heated nips providing momentary contact are at a temperature of 150°–220° C. For flat plate or platen presses, temperatures may be on the order of 120°–170° C. Contact time at elevated temperatures for the laminate in the heated nip would be less than one second while in flat plate presses the preferred contact time is 4–7 seconds.

In another embodiment, the water soluble dried UF resin powder is mixed at the time of use with the ammoniated UF resin solution or suspension followed by the addition of an aqueous solution of a metal acid catalyst or the salt thereof.

In yet another embodiment of the present invention, the metal acid salt, such as aluminum sulfate, is of a fine particle size, i.e., <100 mesh, such that it may be preblended with the water soluble spray dried UF resin powder. The two materials may then be added to the ammoniated UF resin solution or dispersion.

A further embodiment of the present invention employs a water solution of a catalyst applied separately to either the UF-coated substrate after flash drying, or to the gluing face of the paper. The substrate and paper are then brought together followed by heat and/or pressure to cure the adhesive composition and adhere the paper to the substrate. The application of the catalyst to the adhesive composition coated substrate can be by means of any conventional technique, including, for example, but not limited to, spray coating, transfer roller coating, brush on, dip coating, doctor blades, and others.

Once the high solids UF resin composition has been applied to the particleboard, wood or paperboard substrate, with the catalyst included or separately applied, a decorative paper, impregnated with the adhesive composition or nonimpregnated, is applied to the coated or treated side of the substrate. This produces a laminate which is then pressed at temperatures and pressures sufficient to produce cure or partial cure of the catalyzed adhesive composition. In the alternative, the catalyzed adhesive composition could be first applied to the paper and then contacted with the substrate followed by pressure lamination. Either method results in strong bonding of the paper to the substrate. The temperature, pressure and cure time of the laminating step will vary depending on the nature of the resins used (e.g. molecular weight and mol ratio of formaldehyde to urea), the viscosity of the adhesive, the pH, the type and amount of catalyst used and the desired line speed. The laminating step can be static or dynamic.

In applying the adhesive composition to a lignocellulosic substrate or to a paper or both, the adhesive composition need not completely cover the lignocellulosic substrate or the paper. The adhesive composition can be applied in a grid-like pattern, or in a striped pattern or in localized spots or other pattern whereby the adhesive is present in an amount sufficient to provide desired adhesion.

It has also been discovered that the addition of resorcinol to a UF resin adhesive composition of the present invention results in a change of thermal cure characteristics. Resorcinol cannot generally be added directly to a UF resin because of limited resin storage life. However, resorcinol can be added by the present invention to a high solids ammoniated UF/powder UF resin adhesive composition during, or just prior to, application to a board substrate or the decorative paper. The resorcinol can be added as, or to, the catalyst and applied to the paper or to the flash dried UF coated substrate. The presence of resorcinol in the adhesive compositions of the present invention accelerates the cure speed at elevated temperatures. The addition of resorcinol to a non-catalyzed UF resin composition results in the reduction of the exotherm initiation temperature in the cure of the resin. The addition of catalyst reduces even further the temperature at which the cure reaction occurs. The amount of temperature reduction observed varies with the amount of catalyst and/or amount of resorcinol added.

The adhesive compositions of the present invention display low formaldehyde content (generally less than about 1% by weight). The adhesive compositions are stable to preheat temperatures in the range of from about 120° C. to 130° C. The catalyzed compositions cure quickly, do not overpenetrate the substrate, and exhibit excellent adhesion to paper weighing as much as, for example, 110 grams/square meter.

In laminating the paper and the lignocellulosic substrate by the process of the present invention, the pressure and temperature can be any pressure and temperature combination sufficient to cure or partially cure the catalyzed adhesive composition whereby bonding or adhesion of the paper to the substrate is achieved. The preferred temperature range for the lamination is from about 100° to 250° C. and the preferred pressure is in the range of from about 15 to 200 psi.

An additional advantage of the compositions of the present invention is the ability to recycle the used adhesive compositions in the wash water resulting from clean-up operations by neutralizing the water to a pH of about 7.0 and adding additional spray dried UF resin powder to achieve the desired viscosity and solids level.

A typical adhesive composition according to the instant invention is made by charging 100 parts of a 65% solids aqueous ammoniated UF resin solution to a reaction kettle at a temperature of 25° to 30° C. Spray dried UF resin powder, 10 parts, is then added to the solution with stirring until the powder is substantially dissolved or dispersed. The pH is adjusted to a value in a range of from 7.6 to 8.0, by the addition of an acid or alkali as necessary. The product is preferably filtered through 30 mesh screen into a holding tank. The product is an adhesive composition which, upon catalysis, can be used to bond paper to a lignocellulosic substrate.

The high solids adhesive compositions of the present invention, produced by the addition of spray dried water soluble UF resin powder to ammoniated UF resin solutions or suspensions, exhibit shelf stability as measured by relatively little change in viscosity over time. Table I illustrates the stability of viscosity over time as it relates to the percentage by weight of dry powder UF resin added to the ammoniated UF resin solution. Tables II and III show, respectively, the effects of catalyst addition and solvent addition to the compositions.

The following examples are presented to further illustrate the invention and are not to be interpreted as limiting the invention in any way.

EXAMPLE 1

Static Pressure Lamination; Catalyzed Resin On Particleboard

An adhesive composition of the following formulation was prepared:

| | |
|---|---|
| Ammoniated UF resin, CASCO-RESIN ® PR356 (65% resin solids, 35% water, by weight) | 100 parts |
| Powdered UF resin, CASCAMITE ® 151S | 10 parts |
| Catalyst M-198L (50% solution AlCl₃ in water) | 1.0 parts |

The components were combined and mixed for 5 minutes at 25° C. and applied to a particleboard substrate by means of a doctor blade at an add-on weight of approximately 10 lbs./1000 feet. The viscosity of the adhesive composition at the time of application to the substrate was approximately 3200 cps. The adhesive coating was then flash dried with radiant heat from an infra-red lamp source for 2–4 seconds. A decorative paper of weight 110 gms./square meter was applied to the coated surface of the particleboard and the composite thus produced was subjected to a lamination step consisting of contact pressure of 20 psi. at 300° F. for 5–7 seconds. By this method was produced a paper-faced particleboard which displayed excellent adhesion of the paper to the particleboard.

TABLE I

EFFECT OF POWDERED UF CONTENT ON VISCOSITY OF ADHESIVE COMPOSITION.

| PARTS OF RESIN, BY WEIGHT | | TOTAL SOLIDS | VISC. 25° C., CPS | |
|---|---|---|---|---|
| AMMONIATED UF RESIN[1] | POWDER UF RESIN[2] | % | INITIAL | 19 DAYS |
| 100 | 0 | 65.0 | 875 | 1120 |
| 90 | 10 | 68.5 | 2150 | 3400 |
| 85 | 15 | 70.2 | 3400 | 7000 |
| 80 | 20 | 72.0 | 5400 | 16000 |
| 75 | 25 | 73.8 | 7900 | semi gel |

[1]The ammoniated UF resin used was CASCO-RESIN ® PR356 which has approximately 65% non volatile solids and 35% water by weight.
[2]The UF resin powder used was CASCAMITE ® 151S.

TABLE II

VISCOSITY OF CATALYZED ADHESIVE COMPOSITION.

| PARTS OF RESIN, BY WEIGHT | | | VISC. 25° C., CPS | |
|---|---|---|---|---|
| AMMONIATED UF RESIN[1] | POWDER UF RESIN[2] | CATALYST[3] | INITIAL | 1 DAY |
| 85 | 10 | 5 | 2300 | gel |
| 80 | 15 | 5 | 4205 | gel |
| 70 | 25 | 5 | 10,600 | gel |

[1]The ammoniated UF resin used was CASCO-RESIN ® PR356 which has approximately 65% non volatile solids and 35% water by weight.
[2]The UF resin powder used was CASCAMITE ® 151S
[3]The catalyst used was M-198L, a 50% by weight aqueous solution of aluminum chloride.

TABLE III

EFFECT OF SOLVENT ON VISCOSITY OF ADHESIVE COMPOSITION.

| PARTS OF RESIN, BY WEIGHT | | | VISC. 25° C., CPS | |
|---|---|---|---|---|
| AMMONIATED UF RESIN[1] | POWDER UF RESIN[2] | SOLVENT | INITIAL | 19 DAYS |
| 75 | 20 | 5 (water) | 2200 | 4300 |
| 75 | 20 | 5 (ethanol) | 3400 | 6200 |
| 75 | 20 | 5 (methanol) | 2900 | 4950 |

[1]The ammoniated UF resin used was CASCO-RESIN ® PR356 which has approximately 65% non volatile solids and 35% water by weight.
[2]The UF resin powder used was CASCAMITE ® 151S

EXAMPLE 2

Dynamic Pressure Lamination

An adhesive composition of the following formulation was prepared:

| | |
|---|---|
| Ammoniated UF resin, CASCO-RESIN ® PR356, (65% resin solids, 35% water by weight) | 100 parts |
| Powdered UF resin, CASCAMITE ® 151S | 10 parts |

The components were combined and mixed for 5 minutes at 25° C. and applied to a particleboard substrate by means of a roller coater at an add-on weight of 10 lbs./1000 square feet. The viscosity of the adhesive composition at the time of application was approximately 3200 cps. The coating was flash dried with radiant heat from an infra-red lamp source for 2–4 seconds after which the catalyst, H-182LD, was applied to the coating by means of a roller coater technique at an add-on level of 2–3 lbs./1000 square feet. The catalyst, H-182LD, is a maleic anhydride material obtained from Borden, Inc.—Chemical Division, of Marietta, Ga. A paper top ply was contacted with the catalyzed coating and the composite was fed to a dynamic press equipped with heated nip rolls. The composite was thereby subjected to 150 psi. of pressure at 150° C. for 0.5 seconds. By this method was produced a paper coated particleboard which displayed excellent adhesion of the paper to the particleboard.

EXAMPLE 3

Catalyst Added To Back Side Of Paper

Using the adhesive composition of Example 2, particleboard was coated by means of a draw down bar at an add-on weight of 10 lbs./1000 square feet. The coating was flash dried with radiant heat from an infra-red lamp source for 2–4 seconds. The catalyst, H-182LD, obtained from Borden Inc.—Chemical Division of Marietta, Georgia, was applied at a rate of 2–3 lbs/1000 square feet by means of a draw down bar to the back side of a paper to be laminated to the coated board. The catalyst-coated paper and the UF precoated board were then joined in a dynamic pressing lamination step by passing them through nip rolls heated to 300° F. By this method was produced a paper faced particleboard which displayed excellent adhesion of the paper to the board.

EXAMPLE 4

Static Pressure Lamination; Catalyzed Resin On Paper Back Side

The procedure of Example 1 was repeated with the exception of applying the catalyzed resin composition to the back side of the paper rather than the particleboard. The catalyzed UF resin composition was applied by means of a draw down bar at an add-on weight of 10–12 lbs./1000 square feet and the coating was then flash dried as in Example 1. A particleboard preheated to 130° F. (54° C.) was contacted with the coated side of the paper to produce a composite and the composite was laminated as in Example 2.

EXAMPLE 5

Preparation of Ammoniated UF Resin Blended With Powdered UF Resin

To a 50% aqueous solution of formaldehyde was added ammonia with stirring and cooling as necessary to maintain the temperature below 60° C. Urea was then added as rapidly as possible until a formaldehyde/urea ratio of 2.8/1 was achieved followed by 10 minutes of stirring to dissolve the urea. The solution was then heated to 105° C. during which time the resin methylolated and then condensed as the pH drifted from about 9.0 to about 5.0. Heating was stopped and the product was neutralized to pH 7.6–8.0 by the addition of triethanolamine. Urea was then added until a formaldehyde/urea ratio of 2.1/1 was achieved. The solution was then maintained at 85°–90° C. until the viscosity stabilized at Gardner "D-/D". Cascamite TM 151S spray dried UF powdered resin, 13.5% of the total resin solids, was then added and mixed until dissolved. Vacuum distillation with cooling was commenced until the product achieved a viscosity of 1800 to 2200 cps and a solids level of 67% by weight.

EXAMPLE 6

Addition of Resorcinol to Accelerate Cure

To 100 parts of the ammoniated UF resin blended with powdered UF resin produced by the method of Example 5, above, was added 1.5 parts of resorcinol. The mixture was stirred for 5 minutes followed by the addition with stirring of 1 part of catalyst, M-198L, which is a 50% solution of $AlCl_3$ in water. The adhesive composition thus produced was applied to a particleboard substrate by means of a doctor blade at an add-on weight of approximately 10 lbs/1000 square feet. The viscosity of the adhesive composition at the time of application to the substrate was approximately 3200 cps. The adhesive coating was then flash dried with radiant heat from an infra-red lamp source for 2–4 seconds. A decorative paper of weight 110 gms/square meter was applied to the coated surface of the particleboard and the laminate or composite thus produced was laminated by either the dynamic pressure lamination procedure of Example 2 or the static pressure lamination procedure of Example 4. Both lamination methods produced paper-coated particleboard which displayed excellent adhesion of the paper to the particleboard.

EXAMPLE 7

Premixing Aluminum Chloride Catalyst and Resorcinol

Resorcinol, 5 parts based on total resin, and catalyst M-198L (a 50% solution of $AlCl_3$ in water), 1 part based on total resin, were mixed and sprayed at a rate of 3 lbs/1000 square feet onto the back side of a decorative paper. The product of Example 5 was applied by a doctor blade to a particleboard at a rate of 10 lbs/1000 square feet and then flash dried as in Example 2. The decorative paper and the flash dried resin coated particleboard were then contacted and pressure laminated by the methods of Example 2 and 4, above.

EXAMPLE 8

Premixing Aluminum Chloride Catalyst and Resorcinol

Example 7 was repeated with the exception of applying the catalyst mixture to the flash dried resin coated particleboard rather than the back side of a decorative paper. Subsequent pressure lamination of the composite by the methods of Example 2 and 4, above, produced paper coated particleboard which displayed excellent adhesion of the paper to the particleboard.

That which is claimed is:

1. A composition of matter comprising an aqueous solution or suspension of an ammoniated urea-formaldehyde resin wherein said ammoniated urea-formaldehyde resin is prepared by reacting ammonia and a urea-formaldehyde resin or by reacting ammonia and formaldehyde, followed by the addition of urea and wherein said ammoniated urea-formaldehyde resin has a formaldehyde:urea mole ratio of from 2.6:1 to 1.7:1, to which solution or suspension has been added an amount of water soluble dried urea-formaldehyde resin powder, wherein said water soluble dried urea-formaldehyde resin powder is prepared by drying an aqueous solution or suspension of a water soluble urea-formaldehyde resin with a formaldehyde:urea mole ratio of 1.6:1 to 1.3:1, wherein the ratio of ammoniated urea-formaldehyde resin solids to dried urea-formaldehyde resin powder solids is from approximately 20:1 to 2:1 by weight, and wherein the total resin solids level in the composition is in the range of from approximately 65 to 75 percent by weight, and wherein the free formaldehyde content of the composition is less than about 1% by weight.

2. A composition of matter as claimed in claim 1 further comprising a catalyst in an amount sufficient to reduce the pH of the composition produced so as to thereby accelerate the cure of said composition.

3. A composition of matter as claimed in claim 2 wherein the catalyst is selected from the group consisting of resorcinol, maleic anhydride, maleic acid, sulfuric acid, hydrochloric acid, phosphoric acid, aluminum sulfate, aluminum chloride, sodium bisulfate, ammonium sulfate and ammonium chloride.

4. A composition of matter as claimed in claim 1 wherein the viscosity of the composition is in the range of about 600 cps. to 8000 cps. when measured at 25° C.

5. A composition of matter as claimed in claim 1 wherein the ammoniated urea-formaldehye resin is produced by reacting ammonia and urea-formaldehyde resin wherein the amount of ammonia in the ammoniated urea-formaldehyde resin is less than about 4% by weight of the resin.

6. A composition of matter as claimed in claim 1 wherein the ammoniated urea-formaldehyde followed by the addition of urea, wherein the amount of ammonia in the ammoniated urea-formaldehyde resin is less than about 4% by weight.

7. A process for adhering paper to a lignocellulosic substrate comprising:
(a) applying a coating of the composition of claim 1 to a lignocellulosic substrate or to a paper, or both; and
(b) applying to the coated lignocellulosic substrate or to the coated paper, or both, a catalyst in an amount sufficient to reduce the pH of the composition to thereby accelerate the cure of the composition; and
(c) contacting the paper with the lignocellulosic substrate;
whereby the paper adheres to the substrate to produce a laminate.

8. A process as claimed in claim 7 wherein the composition is dried after being applied to a lignocellulosic substrate or to a paper or both, and prior to contacting the paper with the lignocellulosic substrate.

9. A process as claimed in claim 7 further comprising:
(d) subjecting the laminate to lamination temperature and pressure conditions sufficient to cure or partially cure the composition whereby adhesion of the paper to the substrate is achieved.

10. A process for adhering paper to a lignocellulosic substrate comprising:
(a) applying the catalyzed composition of claim 2 to a lignocellulosic substrate or to a paper, or to both;
(b) contacting the paper with the lignocellulosic substrate to produce a laminate; and
(c) subjecting the laminate to sufficent lamination temperature and pressure conditions to cure or partially cure the composition, whereby the paper adheres to the lignocellulosic substrate.

11. A process as claimed in claim 9 wherein the lamination temperature is in the range of from about 100° to 250° C., and the lamination pressure is in the range of from about 15 to 200 psi.

12. A process for adhering paper to a lignocellulosic substrate as claimed in claim 7 wherein the catalyst is selected from the group consisting of resorcinol, maleic anhydride, maleic acid, sulfuric acid, hydrochloric acid, phosphoric acid, aluminum sulfate, aluminum chloride, sodium bisulfate, ammonium sulfate and ammonium chloride.

13. A process for adhering paper to a lignocellulosic substrate as claimed in claim 10 wherein the catalyst is selected from the group consisting of resorcinol, maleic anhydride, maleic acid, sulfuric acid, hydrochloric acid, phosphoric acid, aluminum sulfaaluminum chloride, sodium bisulfate, ammonium sulfate and ammonium chloride.

14. A composition of matter as claimed in claim 3 wherein the viscosity of the composition is in the range of about 600 to 10,000 cps when measured at 25° C.

15. An article produced according to the process of claim 7.

16. An article produced according to the process of claim 9.

17. An article produced according to the process of claim 10.

18. An article produced according to the process of claim 12.

19. An article produced according to the process of claim 13.

20. A composition as claimed in claim 4 wherein after 19 days the composition remains not gelled.

21. A composition of matter comprising:
(a) an aqueous solution or suspension of an ammoniated urea-formaldehyde resin, wherein said ammoniated urea-formaldehyde resin is prepared by reacting ammonia and a urea-formaldehyde resin or by reacting ammonia and formaldehyde, followed by the addition of urea, and wherein said ammoniated urea-formaldehyde resin has a formaldehyde:urea mole ratio of from about 2.6:1 to about 1.7:1, and wherein said ammoniated urea-formaldehyde resin is made by the reaction of less than about 4% by weight ammonia based on the final weight of the ammoniated urea-formaldehyde resin;
(b) a water soluble dried urea-formaldehyde resin powder, wherein said water soluble dried urea-formaldehyde resin powder is prepared by drying an aqueous solution or suspension of a water soluble urea-formaldehyde resin wherein the water soluble urea-formaldehyde resin has formaldehyde:urea mole ratio of from about 1.6:1 to about 1.3:1; and (c) a solvent selected from the group consisting of ethanol, water and methanol, and wherein the ratio of ammoniated urea-formaldehyde resin solids to dried urea-formaldehyde resin powder solids is from approximately 2:1 to 1:20 by weight, and wherein the total resin solids content in the composition is in the range of from approximately 60 to 90 percent by weight, and wherein the solvent content in the composition is in the range of from approximately 10 to 40 percent by weight, and wherein the free formaldehyde content of the composition is less than about 1% by weight.

22. A composition as claimed in claim 21 wherein the viscosity of the composition when prepared is less than about 3400 centipoise at 25° C. and wherein the viscosity after 19 days is less than about 5000 centipoise at 25° C.

* * * * *